US008126095B1

(12) United States Patent
Pare, Jr.

(10) Patent No.: US 8,126,095 B1
(45) Date of Patent: Feb. 28, 2012

(54) MAXIMUM RATIO COMBINING ARCHITECTURES FOR OPTIMAL COMPLEMENTARY CODE KEYING RECEIVER DESIGN

(75) Inventor: Thomas Edward Pare, Jr., Mountain View, CA (US)

(73) Assignee: Ralink Technology Corporation, Jhubei (TW)

(*) Notice: Subject to any disclaimer, the term of this patent is extended or adjusted under 35 U.S.C. 154(b) by 1529 days.

(21) Appl. No.: 11/584,025

(22) Filed: Oct. 20, 2006

Related U.S. Application Data

(63) Continuation-in-part of application No. 11/048,075, filed on Jan. 31, 2005, now Pat. No. 7,486,751, which is a continuation-in-part of application No. 10/782,351, filed on Feb. 18, 2004, now Pat. No. 7,369,626, and a continuation-in-part of application No. 10/797,299, filed on Mar. 9, 2004, now Pat. No. 7,245,677, and a continuation-in-part of application No. 10/402,697, filed on Mar. 28, 2003, now Pat. No. 7,197,094, and a continuation-in-part of application No. 10/402,710, filed on Mar. 28, 2003, now Pat. No. 7,266,146.

(51) Int. Cl.
  *H04B 7/10* (2006.01)
  *H04L 1/02* (2006.01)
(52) U.S. Cl. ........ 375/347; 375/348; 375/349; 375/350; 375/267

(58) Field of Classification Search .................. 375/144, 375/148, 259, 261, 324, 347, 299; 455/562.1, 455/39, 59, 517
See application file for complete search history.

(56) References Cited

U.S. PATENT DOCUMENTS

| 4,038,536 | A  | * | 7/1977 | Feintuch ..................... 708/322 |
| 5,910,970 | A  | * | 6/1999 | Lu ................................ 375/377 |
| 6,907,270 | B1 | * | 6/2005 | Blanz ...................... 455/562.1 |
| 7,019,595 | B1 |   | 3/2006 | Lo et al. |
| 7,194,237 | B2 | * | 3/2007 | Sugar et al. ..................... 455/39 |
| 7,197,094 | B2 |   | 3/2007 | Tung |
| 7,245,677 | B1 |   | 7/2007 | Pare, Jr. |
| 7,248,650 | B1 |   | 7/2007 | Tung et al. |
| 7,266,146 | B2 |   | 9/2007 | Pare, Jr. et al. |
| 2004/0076224 | A1 | * | 4/2004 | Onggosanusi et al. ....... 375/144 |
| 2004/0105512 | A1 | * | 6/2004 | Priotti ........................ 375/340 |
| 2004/0203456 | A1 | * | 10/2004 | Onggosanusi et al. .... 455/67.13 |

* cited by examiner

*Primary Examiner* — Khanh C Tran
*Assistant Examiner* — Qutbuddin Ghulamali
(74) *Attorney, Agent, or Firm* — Maryam Imam; IPxLAW Group LLP (57) ABSTRACT

A multi input multi output (MIMO) receiver for receiving signals having a plurality of equalizers being responsive to aligned signals for processing the same to generate a plurality of equalized outputs using filter coefficients, in accordance with an embodiment of the present invention. The MIMO receiver for training said plurality of equalizers to adapt said filter coefficients for generating said plurality of equalized outputs, said MIMO receiver for combining said plurality of equalized outputs in time domain to generate a weighted output, said MIMO receiver for improving the quality of said weighted output by performing equalization prior to combining said plurality of equalized outputs.

16 Claims, 5 Drawing Sheets

MAXIMUM RATIO COMBINING ARCHITECTURES FOR OPTIMAL COMPLEMENTARY CODE KEYING RECEIVER DESIGN

CROSS REFERENCE TO RELATED APPLICATIONS

This application is a continuation-in-part of U.S. patent application Ser. No. 11/048,075 filed on Jan. 31, 2005, now U.S. Pat. No. 7,486,751 and entitled "JOINT TIME/FREQUENCY DOMAIN MAXIMUM RATIO COMBINING ARCHITECTURES FOR MULTI INPUT MULTI OUTPUT WIRELESS RECEIVERS", which is a continuation-in-part of U.S. patent application Ser. No. 10/782,351 filed on Feb. 18, 2004, now U.S. Pat. No. 7,369,626 and entitled "EFFICIENT SUBCARRIER EQUALIZATION TO ENHANCE RECEIVER PERFORMANCE" and a continuation-in-part of U.S. patent application Ser. No. 10/797,299 filed on Mar. 9, 2004, now U.S. Pat. No. 7,245,677 and entitled "AN EFFICIENT METHOD FOR MULTI-PATH RESISTANT CARRIER AND TIMING FREQUENCY OFFSET DETECTION" and a continuation-in-part of U.S. patent application Ser. No. 10/402,697 filed on Mar. 28, 2003, now U.S. Pat. No. 7,197,094 and entitled "SYMBOL-BASED DECISION FEEDBACK EQUALIZER (DEF) WITH MAXIMUM LIKELIHOOD SEQUENCE ESTIMATION FOR WIRELESS RECEIVERS UNDER MULTI-PATH CHANNELS" and a continuation-in-part of U.S. patent application Ser. No. 10/402,710 filed on Mar. 28, 2003, now U.S. Pat. No. 7,266,146 and entitled "SYMBOL-BASED DECISION FEEDBACK EQUALIZER (DEF) OPTIMAL EQUALIZATION METHOD AND APPARATUS WITH LIKELIHOOD SEQUENCE ESTIMATION FOR WIRELESS RECEIVERS UNDER MULTI-PATH CHANNELS" which are incorporated herein by reference as though set forth in full.

BACKGROUND OF THE INVENTION

1. Field of the Invention

The present invention relates generally to the field of multi input multi output (MIMO) receivers and particularly to a method and apparatus for optimizing complementary code keying (CCK) receiver design using independent equalizer combining in the time domain.

2. Description of the Prior Art

As computers have gained enormous popularity in recent decades, so have networking the same allowing for access of files by one computer from another. More recently and with the advent of wireless communication, remote and wireless networking of computers is gaining more and more notoriety among personal users, small and large business owners, factory facilities and the like.

With regard to the wireless networking of personal computers including laptops, a particular modem, namely modems adapted to the IEEE 802.11a or 802.11g industry standard, are commonly employed. That is, an antenna is placed inside or nearby the personal computer and an RF chip receives signal or data through the antenna and an analog-to-digital converter, typically located within the personal computer (PC), converts the received signal to baseband range. Thereafter, a baseband processor is employed to process and decode the received signal to the point of extracting raw data, which may be files transferred remotely and wireless, from another PC or similar equipment with the use of a transmitter within the transmitting PC.

To improve reception of data at higher rates wireless receivers often employ multiple antennae. In the design of multi input multi output (MIMO) transceivers new technical challenges such as the requirement to combine multiple channels emerge. Conventional 802.11g compliant receivers decode data modulated in both the time (complementary code keying (CCK)) and frequency domains (orthogonal frequency division multiplexing (OFDM)).

Conventional approaches to multi antennae receiver designs include maximum antenna approach wherein the antenna with maximum received signal power is chosen for reception. Other conventional approaches include an all time domain design which is a stand-alone module but does not allow the advantage of frequency domain combining that is more suitable for OFDM processing. The all time domain design also has the disadvantage of having a costly implementation in terms of silicon die area. Moreover, a design restricted to frequency domain, which benefits OFDM reception, does not necessarily improve the CCK receiving portion of the receiver.

Combining of signals before equalization in the conventional 802.11g compliant receivers is sub-optimal due to potential destructive effects of addition of channels off the main tap. In addition, holding the computed maximum ratio combining (MRC) parameters constant during the subsequent equalization process may not yield the highest quality signal for CCK decoding.

Thus, it is desirable to develop a method and apparatus for improving the performance of the MIMO receivers by optimizing the equalization process. In addition, the effects of multi-path channels should be minimized by improving the MRC parameters used in the equalization process.

SUMMARY OF THE INVENTION

Briefly, an embodiment of the present invention includes a multi input multi output (MIMO) receiver for receiving signals having a plurality of equalizers being responsive to aligned signals for processing the same to generate a plurality of equalized outputs using filter coefficients. The MIMO receiver for training said plurality of equalizers to adapt said filter coefficients for generating said plurality of equalized outputs, said MIMO receiver for combining said plurality of equalized outputs in time domain to generate a weighted output, said MIMO receiver for improving the quality of said weighted output by performing equalization prior to combining said plurality of equalized outputs.

The foregoing and other objects, features and advantages of the present invention will be apparent from the following detailed description of the preferred embodiments which make reference to several figures of the drawing.

DETAILED DESCRIPTION OF THE PREFERRED EMBODIMENTS

Figure 1:
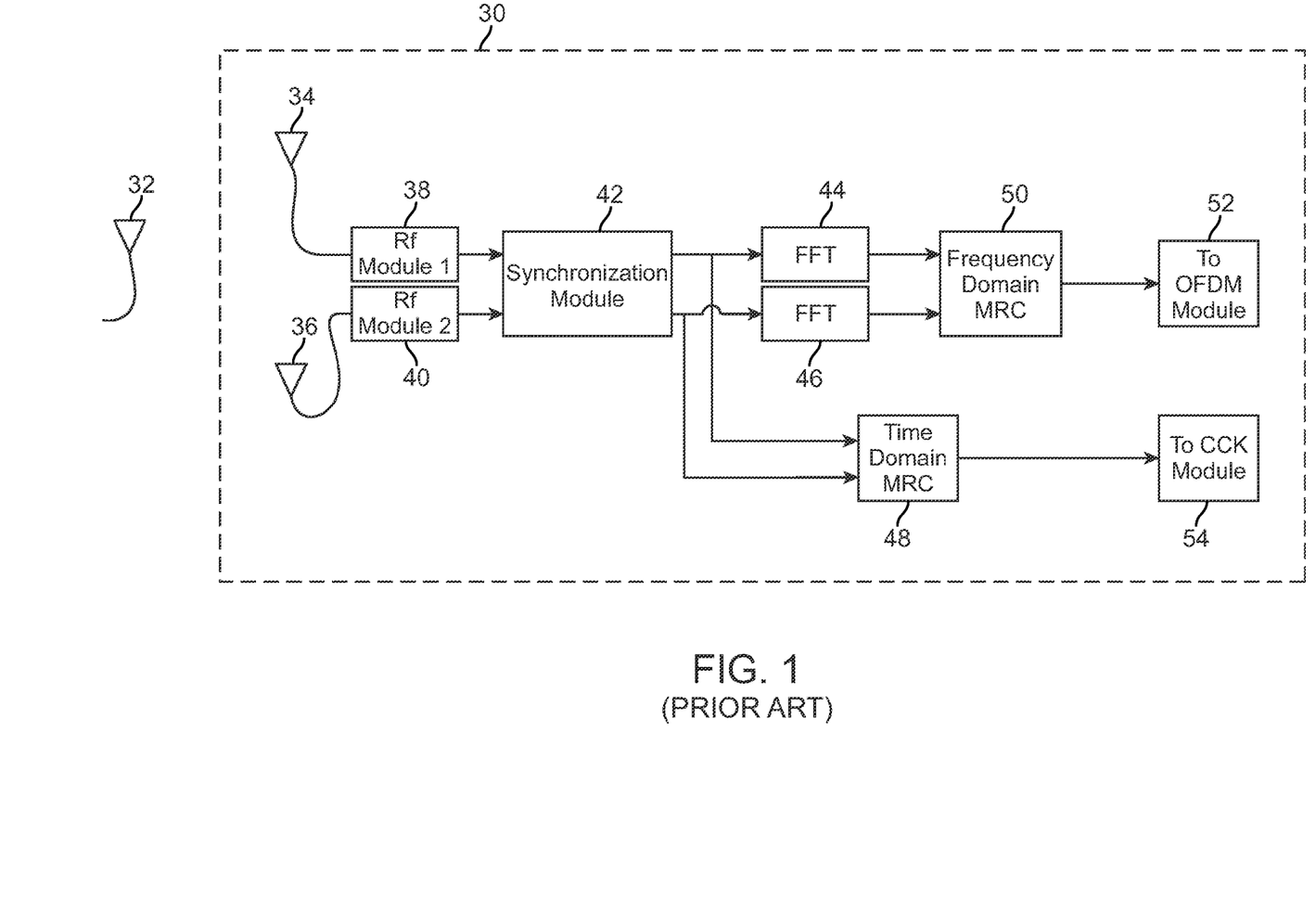
FIG. 1 shows a prior art joint time/frequency domain maximum ratio combining (MRC) architecture for a multi input multi output (MIMO) receiver, in accordance with an embodiment of the present invention.

Referring now to FIG. 1, a prior art joint time/frequency domain maximum ratio combining (MRC) architecture for a multi input multi output (MIMO) receiver 30 is shown, in accordance with an embodiment of the present invention. Also shown in FIG. 1 is a transmitter antenna 32 for transmitting signals to the MIMO receiver 30. The MIMO receiver 30 includes two receiving antennae 34 and 36, two radio frequency (RF) modules 38 and 40, a synchronization (SYNC) module 42, two fast fourier transform (FFT) modules 44 and 46, a frequency domain orthogonal frequency division multiplexing (OFDM) MRC module 50, an OFDM module 52, a time domain complementary code keying (CCK) MRC module 48, and a CCK module 54.

The receiving antennae 34 and 36 are coupled to the RF modules 38 and 40, respectively, which are coupled to the SYNC module 42. The SYNC module 42 is coupled to the two FFT modules 44 and 46 and the time domain CCK MRC module 48 which is coupled to the CCK module 54. The FFT modules 44 and 46 are coupled to the frequency domain OFDM MRC module 50 which is coupled to the OFDM module 52.

The signal transmitted by the antenna 32 is received by the receiving antennae 34 and 36, each of which processes a received signal. The RF modules 38 and 40 convert the received signals to received baseband signals which are transferred to the SYNC module 42. The SYNC module 42 aligns the OFDM modulated signals, included in the received baseband signals, in time domain to generate two aligned OFDM signals.

Conventional 802.11g compliant receivers decode data modulated in the time domain CCK and frequency domain OFDM modes. The received baseband signals are either CCK or OFDM modulated signals. That is the received signals have been modulated using either CCK modulation scheme in time domain or OFDM modulation scheme in frequency domain. The time offset d between the peak locations of the magnitudes of the two received baseband signals is computed In addition, the phase offset between the two CCK modulated signals is computed. The time and phase offsets are included in the maximum ratio combining (MRC) parameters for the CCK modulated signals. The SYNC module 42 computes the MRC parameters for the CCK modulated signals.

Specifically, the SYNC module 42 computes the MRC parameters for the CCK modulated signals including the time offset d between peak locations of the signals. Also computed is the phase offset $\phi$ for phase adjustment of the CCK modulated signals as described hereinabove. The time and phase offsets are included in the phase/timing alignment parameters which are included in the MRC parameters. The MRC parameters are transferred to the time domain CCK MRC module 48. The SYNC module 42 also uses the time offset d to align the two OFDM modulated signals in time domain to generate two aligned OFDM signals which are transferred to the FFT modules 44 and 46.

The time domain CCK MRC module 48 applies the time offset and the phase offset to the CCK modulated signals in time domain to generate aligned signals. The aligned signals are combined to generate an adjusted signal which is transferred to the CCK module 54 for demodulation.

The FFT modules 44 and 46 perform 64-point FFT converting the 64 time domain samples in each of the two aligned OFDM signals into 64 frequency domain subcarriers which comprise one data symbol. Both sets of subcarriers are transferred to the frequency domain OFDM MRC module 50. The frequency domain OFDM MRC module 50 performs phase adjustment in the frequency domain as part of the equalization process to combine the subcarriers.

The combination of the aligned signals in time domain performed by the time domain MRC module 48 is sub-optimal although cost effective and simple to implement. However, the frequency domain MRC module 50 combines subcarriers in an optimal way because combination is performed with equalization.

In contrast, in the time domain the aligned signals are initially combined at the time domain MRC module 48 to generate an adjusted signal. Subsequent equalization of the adjusted signal is performed at the CCK module 54. Accordingly, channel combining is performed using pre-equalized signals wherein addition of the channels off the main tap may be destructive and result in sub-optimal performance for the receiver. Another disadvantage may arise in using the computed MRC parameters. Namely, as the computed MRC parameters are held constant and not allowed to change the subsequent equalization may not yield the highest quality signal for CCK decoding. This is because by fixing the MRC parameters the information in the two signal paths may not be utilized optimally.

Figure 2:
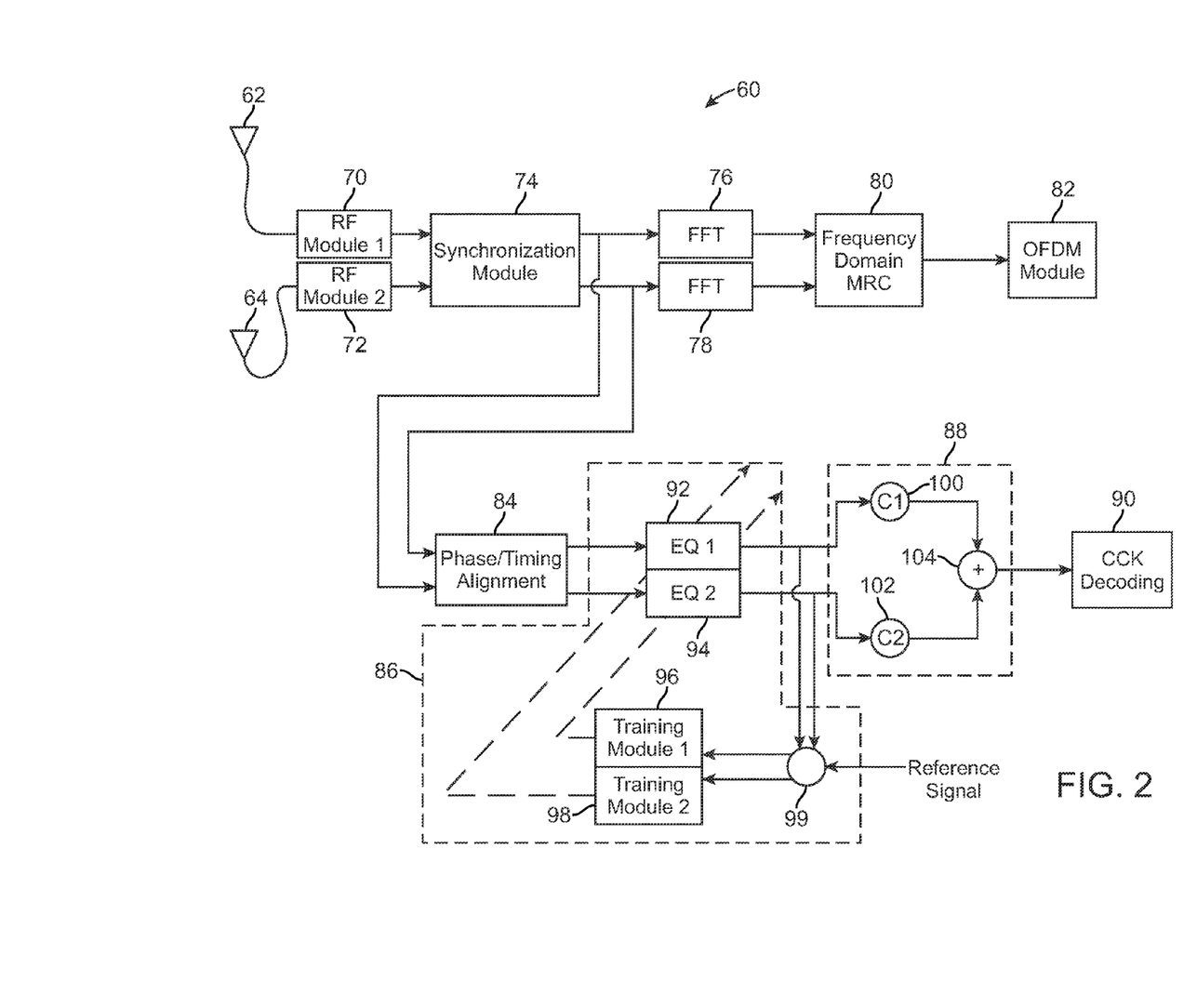
FIG. 2 shows an alternate time/frequency MRC architecture for independent equalizer combining of a multi input multi output (MIMO) receiver, in accordance with an embodiment of the present invention.

Referring now to FIG. 2, an alternative time/frequency MRC architecture for independent equalizer combining of a multi input multi output (MIMO) receiver 60 is shown to include two radio frequency (RF) modules 70 and 72, a SYNC module 74, two FFT modules 76 and 78, a frequency domain MRC module 80, an OFDM module 82, a phase/timing alignment module 84, an equalizer adaptation module 86, a time domain MRC module 88, and a CCK decoding module 90, in accordance with an embodiment of the present invention. The equalizer adaptation module 86 includes two equalizers 92 and 94 and two training modules 96 and 98 and a error module 99. Also shown in FIG. 2 are two receiving antennas 62 and 64 that are coupled to the RF modules 70 and 72, respectively.

The RF modules 70 and 72 are coupled to the SYNC module 74 which is coupled to the FFT modules 76 and 78 and the phase/timing alignment module 84. The FFT modules 76 and 78 are coupled to the frequency domain MRC module 80 which is coupled to the OFDM module 82. The phase/timing alignment module 84 is coupled to the two equalizers 92 and 94 which are coupled to the time domain MRC module 88 and the error module 99. The error module 99 is coupled to the training modules 96 and 98 which are coupled to the equalizers 92 and 94, respectively. The time domain MRC module 88 includes two weighting computation modules 100 and 102 and a summation junction 104. The weighting computation modules 100 and 102 are coupled to the summation junction 104 which is coupled to the CCK decoding module 90.

The signals transmitted by the transmitter (not shown in FIG. 2) are received by the receiving antennas 62 and 64 which generate two received signals. The RF modules 70 and 72 process the received signals to generate two received baseband signals which are transferred to the SYNC module 74. The received baseband signals include both CCK and OFDM modulated signals.

In another embodiment of the present invention the MIMO receiver 60 includes more than two RF modules being responsive to three or more receiving antennas. Under such circumstances, the MIMO receiver 60 would include more than two equalizers with an equal number of training modules.

The SYNC module 74 aligns the OFDM modulated signals included in the received baseband signals in time domain to generate two aligned OFDM signals. Additionally, the SYNC module 74 computes the phase/timing alignment parameters for the CCK modulated signals which include the time offset d between peak locations of the received baseband signals and the phase offset φ for phase adjustment of the CCK modulated signals. The phase/timing alignment parameters are included in the MRC parameters which are transferred to the phase/timing alignment module 84. The SYNC module 74 uses the time offset d to align the two OFDM modulated signals in time domain to generate two aligned OFDM signals which are transferred to the FFT modules 76 and 78.

The phase/timing alignment module 84 applies the time and phase offsets to the CCK modulated signals in time domain to generate aligned signals. The aligned signals are transferred to the equalizers 92 and 94 for equalization.

The FFT modules 76 and 78 perform 64-point fast fourier transform converting the 64 time domain samples in each of the OFDM signals into 64 frequency domain subcarriers which comprise one data symbol. Both sets of subcarriers are transferred to the frequency domain MRC module 80 wherein phase adjustment in the frequency domain is performed as part of the equalization process to combine the subcarriers.

The two aligned signals are transferred to the independent equalizers 92 and 94, respectively. The equalizers 92 and 94 generate two equalized outputs that are combined in the time domain MRC module 88 using weighting coefficients to generate a weighted output. The weighted output is transferred to the CCK decoding module 90 for demodulation. The time domain MRC module 88 utilizes two weighting coefficients $C_1$ and $C_2$ in the first and second weighting computation modules 100 and 102, respectively. Based on $C_1$ and $C_2$ two weighted equalized outputs are generated and combined at the summation junction 104 to generate the weighted output. The weighting coefficients $C_1$ and $C_2$ are generated using the output of the error module 99.

The weighting coefficients $C_1$ and $C_2$ are computed during the equalizer training process based on errors measured between the equalized outputs and reference signals. Accordingly the equalized output with a higher measure of fidelity with respect to the reference signal is emphasized by the weighting coefficients and the equalized output having a large error is deemphasized. In this way an optimal way of time domain maximum ratio combining (MRC) is achieved. Presence of large error indicates a substantial deviation form the reference signal due to the presence of noise and other multipath effects.

In addition, the equalizers 92 and 94 are independently trained by the least mean squared (LMS) training modules 96 and 98, respectively. Therefore, equalization is performed prior to combining the equalized outputs using the weighting coefficients. In another embodiment of the present invention the training modules 96 and 98 use a different algorithm such as recursive least squares (RLS) or some other algorithm to train the equalizers 92 and 94.

Training is used to determine the least squared approximation to the reference signal based on the measurement of mean square error so that a measure of fidelity for each of the equalized outputs is established. Use of the weighting coefficients allows the equalized path with higher fidelity to be mainly represented in the weighted output, as described in more detail hereinbelow.

The MIMO receiver 60, shown in FIG. 2, includes a processor (not shown), or computer medium, some other type of storage medium, for storing the software/firmware described in FIG. 2. The processor executes codes from the computer readable medium for effectuating the functions outlined in FIG. 2.

Figure 3:
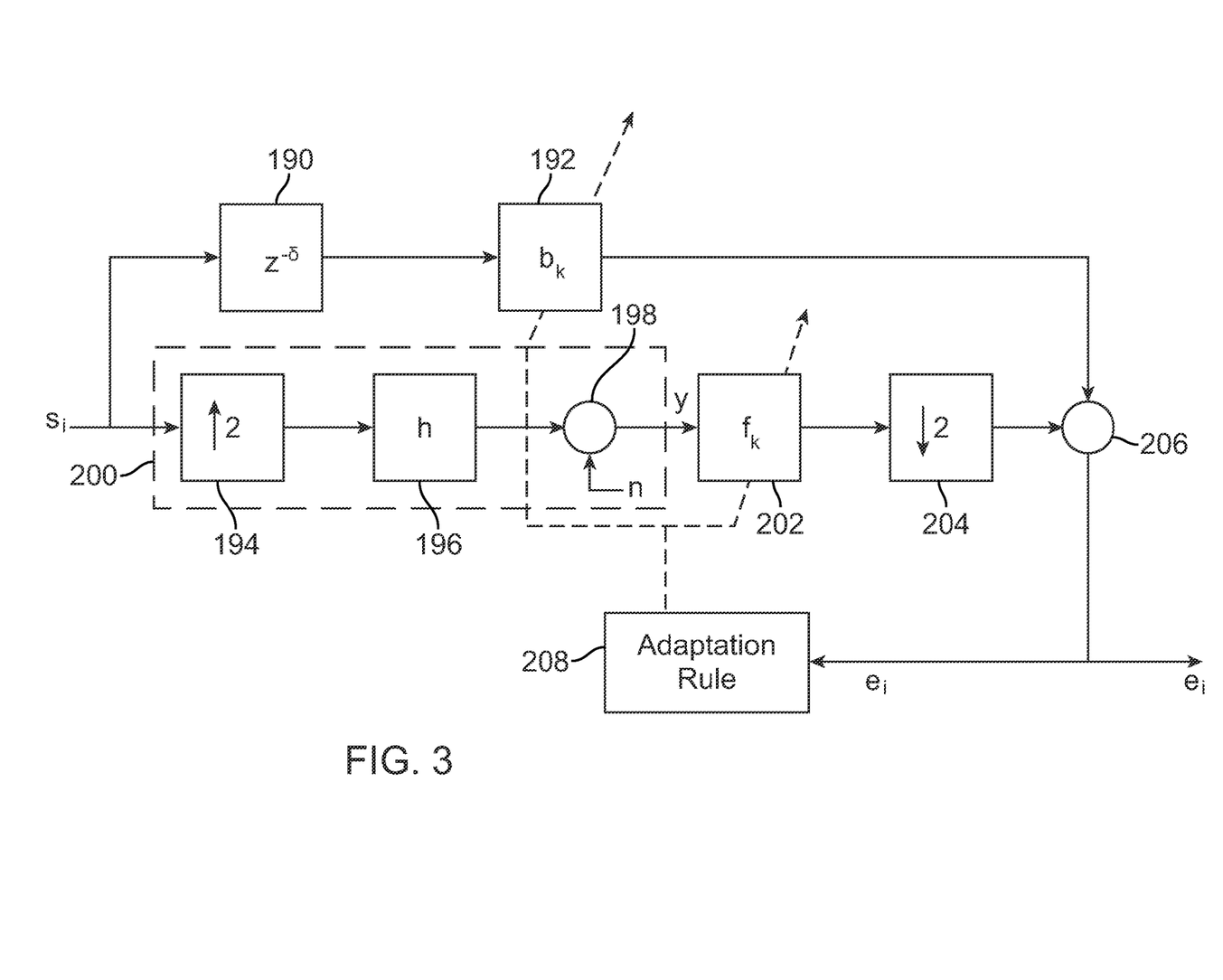
FIG. 3 shows the main steps in an equalizer training diagram, in accordance with an embodiment of the present invention.

Referring now to FIG. 3, the main steps in an equalizer training diagram is outlined, in accordance with an embodiment of the present invention. The steps outlined in FIG. 3 are carried out in the equalizer adaptation module 86 of the MIMO receiver 60.

In FIG. 3, the sequence $s_i$ corresponding to the symbols is transmitted to either of the equalizers 92 and 94 as part of the preamble portion of the input data. The $s_i$ is given a preselected delay δ as shown in step 190 and processed by the decision feedback equalizer (DFE) circuit at step 192 with filter coefficients $b_k$, where k is incremented at the symbol rate, such as 22 MHz. In addition, at step 202 the aligned signal $y_i$ is processed by the feedforward filter (FFF) (equalizer) circuit with filter coefficients $f_k$. The aligned signals are generally noisy, in part due to analog to digital conversion, as indicated by the summation junction 198.

Note that the y signal is 2× over-sampled as indicated in 194, however, since the FFF circuit is fractionally spaced as shown in 204, the output of the FFF circuit is still at the chip rate such as 11 MHz. In the 802.11b decoder, every 11 chips correspond to one symbol. To adaptively train either of the equalizers 92 or 94 the difference between the outputs of the FFF and the DFE circuits, as represented by the error signal $$e_j = f^* y_j - b^* s_j, \quad (1)$$

is minimized, where the j index refers to the jth iteration within a chip. In the embodiment of the present invention, both $b_k$ and $f_k$ are allowed to adapt simultaneously in order to reduce the effects of inter-symbol interference more efficiently.

Equation (1) may be written as $$e_j = f^* y_j - \beta^* s_j - B_0 s_{0j}. \quad (2)$$

Vector β denotes the vector b with the leading tap $B_0$ missing. The leading tap is set to a fixed value and omitted from β, therefore not being adapted with the other filter coefficients. The reason for such an omission is to avoid the trivial solution, i.e. f=0 and b=0 ⇒ $e_j$=0. The vector s has the leading chip $s_{0j}$, corresponding to the leading tap, omitted as well with the resulting decimated vector designated as s.

The filter coefficients and data vectors may be combined to rewrite equation (2) as $$e_j = g_k^* u_j - B_0 s_{0j}, \quad (3)$$

where, $$g_k^T = [f^* \beta^*]_k \text{ and } u_j^T = [y^* -\underline{s}^*]_j,$$

where the superscript T indicates transpose of the vector. The filter coefficients are updated in two steps. In the first step, coefficient accumulator, G(k), is updated during the $k^{th}$ symbol as $$G(k+1) = G(k) + \Sigma \mu \nabla_j, \quad (4)$$

where, the instantaneous gradient $\nabla_j$, corresponding to the $j^{th}$ chip, is defined by $\nabla_j = u_j e_j^*$ and μ is a small number referred to as the adaptation constant. The summation index j, in equation (4), ranges over the number of chips in a sequence, which for the Barker sequence corresponds to 11. In the second step, the updated filter coefficients for the $k^{th}$ symbol, obtained by accessing the upper 8-bits of the coefficient accumulator, are given by $$g_{k+1}=G(k)[1:\text{end}, 1:8], \quad (5)$$

where the upper 8 bits of each element of the vector G(k) are used in determining $g_{k+1}$. The adaptation constant µ has a value in the general range of $2^{-14}$ to $2^{-16}$, to ensure that the adaptation scheme does not diverge and to allow for additional noise smoothing. The end result of the adaptation scheme described hereinabove is a set of filter coefficients that are used to equalize the actual data.

The adaptation equation (5) is used in the training modules 96 and 98 to update the filter coefficients $f_k$ and $\beta_k$. The steps 192 and 202 indicating the operation of the DFE and FFF circuits, respectively, are carried out in the equalizers 92 and 94. The output of the DFE circuit at step 192 is the reference signal shown in FIG. 2 and the summation junction 206 corresponds to the error module 99 in FIG. 2.

The error computed at the output of the summation junction 206 is transferred to the training modules 96 and 98. Equalizer 92 generates an error that is transferred to the training module 96 and equalizer 94 generates another error that is transferred to the training module 98. The errors are used in the training modules 96 and 98 to generate updated filter coefficients for training the equalizers 92 and 94. The equalizers 92 and 94 in turn use the updated coefficients to generate new errors thereby setting up an iterative process to minimize the errors.

Figure 4:
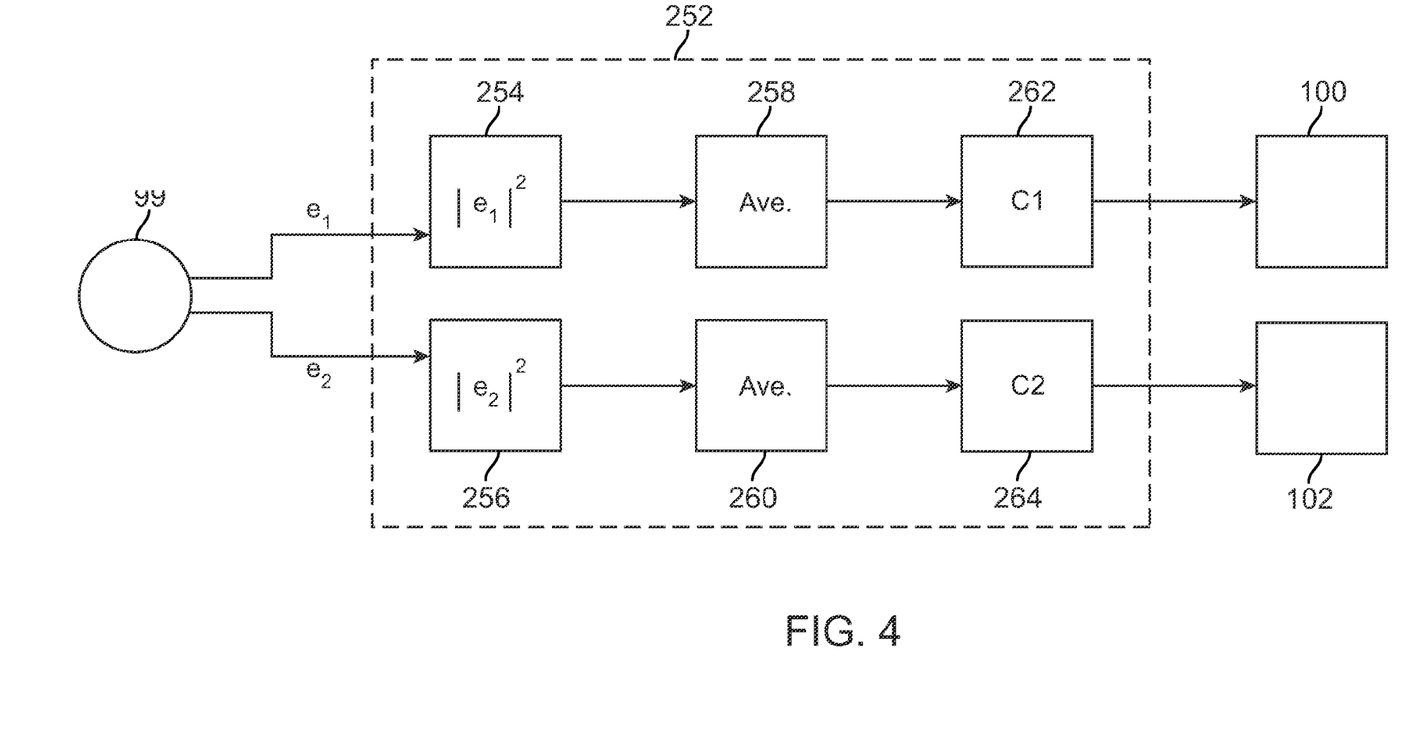
FIG. 4 shows the architecture for a time domain maximum ratio combining (MRC) module, in accordance with an embodiment of the present invention.

Referring now to FIG. 4, the architecture for a time domain MRC training module 252 is shown, in accordance with an embodiment of the present invention. Also shown in FIG. 4 is the error module 99, coupled to the time domain MRC training module 252, and a CCK decoupling module 268. The time domain MRC training module 252 includes two magnitude computation modules 254 and 256, two averaging modules 258 and 260, and two weighting coefficient modules 262 and 264.

The individual outputs of the error module 99 are transferred to the magnitude computation modules 254 and 256. The magnitude computation modules 254 and 256 are coupled to the averaging modules 258 and 260, which are coupled to the weighting coefficient modules 262 and 264, respectively. In one embodiment of the present invention, the weighting coefficient modules 262 and 264 could compute the constants $C_1$ and $C_2$ as described in detail hereinbelow.

In another embodiment of the present invention, the magnitude computation modules 254 and 256 are combined with the averaging modules 258 and 260, respectively. In yet another embodiment of the present invention, the magnitude computation module and the averaging module are included in the equalizer.

The equalizers 92 and 94 are initialized to some value for processing the aligned signals. The equalizers 92 and 94 are trained, as described hereinabove, to generate the equalized outputs whereby steady state values are reached to minimize the errors. The equalizers 92 and 94 generate the mean square error (MSE) between the equalized outputs and the reference signal. The instantaneous mean square error generated by the equalizer 92 during the training process is $e_1$ and the instantaneous mean square error generated by the equalizer 94 is $e_2$. The instantaneous mean square errors are transferred to the magnitude computation modules 254 and 256, respectively, wherein square of the magnitudes $|e_1|^2$ and $|e_2|^2$ of the mean square errors are computed.

The instantaneous mean square errors, being functions of time are generally noisy and therefore need to be averaged. The averaging modules 258 and 260 compute the first and second averaged errors $(|e_1|_{AVG})^2$ and $(|e_2|_{AVG})^2$, respectively. Averaging process smoothes out the noisy error signals and allows computation of weighting coefficients in the weighting coefficient modules 262 and 264.

The weighting coefficients $C_1$ and $C_2$ are generated according to $$C_1=(|e_2|_{AVG})^2/[(|e_2|_{AVG})^2+(|e_1|_{AVG})^2],$$

$$C_2=(|e_1|_{AVG})^2/[(|e_2|_{AVG})^2+(|e_1|_{AVG})^2]$$

For a large $(|e_1|_{AVG})^2$ the weighting coefficient $C_1$ tends to approach zero and $C_2$ tends to approach one. If $(|e_1|_{AVG})^2$ and $(|e_2|_{AVG})^2$ have almost the same magnitude, both $C_1$ and $C_2$ tend to substantially approach the value ½. The weighting coefficients $C_1$ and $C_2$ are transferred to the weighting computation modules 100 and 102, respectively.

The first equalized output generated by the equalizer 250 is multiplied by $C_1$ to generate the first weighted equalized output and the second equalized output generated by the equalizer 94 is multiplied by $C_2$ to generate the second weighted equalized output in the time domain MRC module 88. The first and second weighted equalized outputs are combined at the summation junction 104 to generate a weighted output which is transferred to the CCK decoding module 90 for demodulation.

Figure 5:
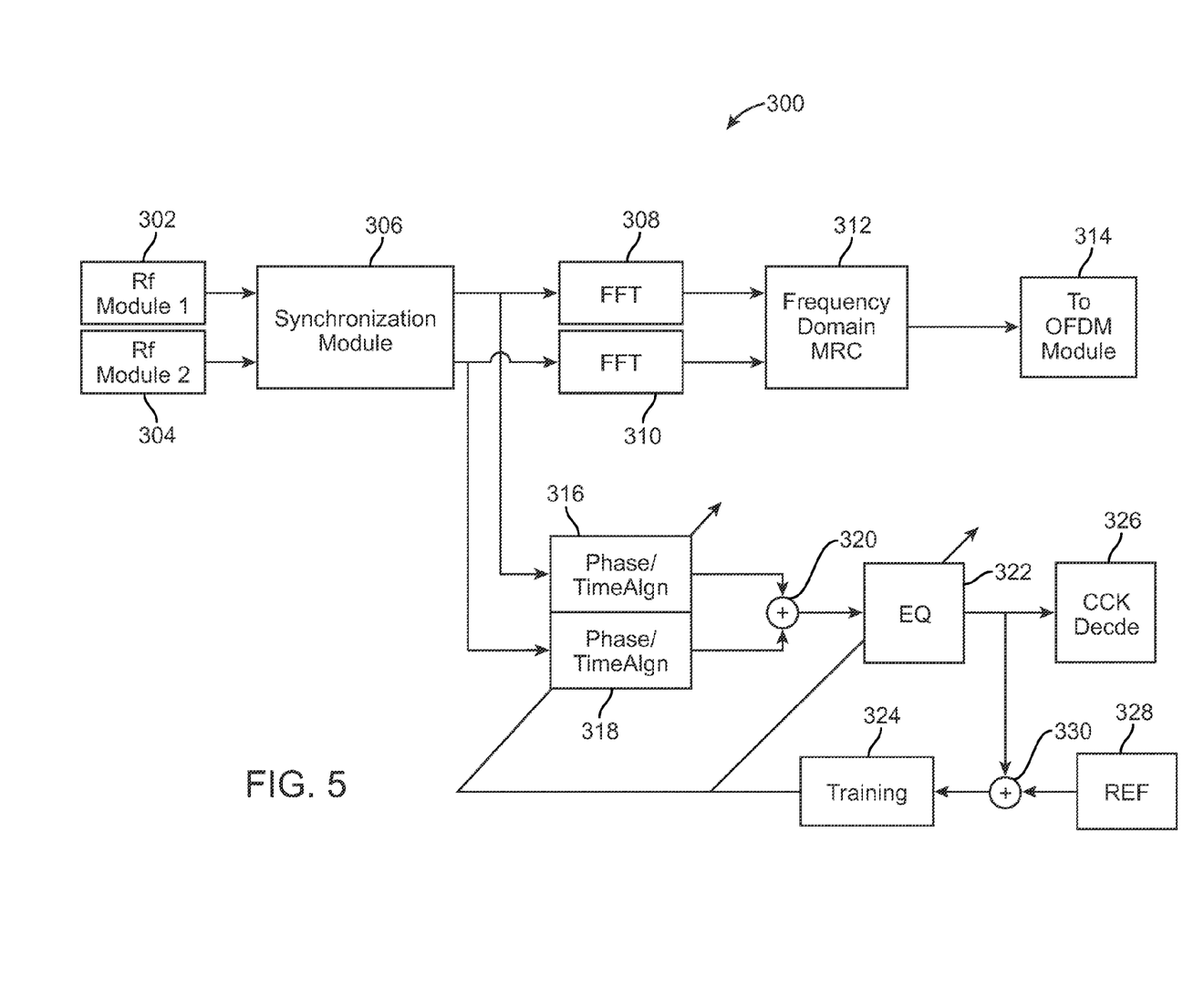
FIG. 5 shows an alternate time/frequency MRC architecture of an MIMO receiver, in accordance with an embodiment of the present invention.

Referring now to FIG. 5, an alternate time/frequency MRC architecture of an MIMO receiver 300 is shown to include two RF modules 302 and 304, a SYNC module 306, two FFT modules 308 and 310, a frequency domain MRC module 312, an OFDM module 314, two phase/timing alignment modules 316 and 318, a summation module 320, an equalizer 322, a training module 324, a CCK decoding module 326, a reference signal module 328, and a summation junction 330, in accordance with an embodiment of the present invention.

Referring back to FIG. 2, the phase/timing alignment parameters computed by the SYNC module 74 are held constant during the training of the equalizers 92 and 94. In addition, using two equalizers in the MIMO receiver 60 increases the complexity thereof and requires more power. This is because the equalizer is relatively large compared to the CCK decoding module 90. However, in the embodiment of the present invention shown in FIG. 5 the phase/timing alignment parameters are allowed to change and are trained by the training module 324 to result in two phase/timing aligned signals which are combined into a single phase/timing aligned output. The phase/timing aligned output is then equalized by the single equalizer 322 thereby reducing the complexity of the receiver architecture shown in FIG. 5. In addition, near optimal performance is achieved by allowing the phase/timing alignment parameters to vary during the training process to determine substantially optimal set of phase/timing alignment parameters. Accordingly, the phase/timing aligned signals are combined prior to equalization so that only one equalizer is required in the MIMO receiver 300.

In another embodiment of the present invention the MIMO receiver 300 includes more than two RF modules responsive to signals from three or more receiving antennas. Under such circumstances, the MIMO receiver 300 includes more than two phase/timing alignment modules.

The RF modules 302 and 304 are coupled to the SYNC module 306 which is coupled to the FFT modules 308 and 310 which is coupled to the frequency domain MRC module 312 which is coupled to the OFDM module 314. The SYNC module 306 is further coupled to the phase/timing alignment modules 316 and 318 which is coupled to the summation junction 320 which is coupled to the equalizer 322 which is coupled to the CCK decoding module 326 and the summation junction 330. The reference signal module 328 is coupled to the summation junction 330 which is coupled to the training module 324 which is coupled to the equalizer 322 and the phase/timing alignment modules 316 and 318.

The operation of the RF modules 302 and 304, the SYNC module 306, the FFT modules 308 and 310, the frequency domain MRC module 312 and the OFDM module 314 are as described with respect to FIG. 2 with no substantial changes to require further elaboration.

The SYNC module 306 generates the phase/timing alignment parameters for each of the CCK modulated received baseband signals. The phase/timing alignment parameters for the first set of received baseband signals received by the RF module 302 are transferred to the phase/timing alignment module 316 and the phase/timing alignment parameters for the second set of received baseband signals received by the RF module 304 are transferred to the phase/timing alignment module 318.

The phase/timing alignment parameters are trained, by the training module 324 to determine two sets of phase/timing alignment parameters that minimize the errors. The two sets of phase/timing alignment parameters are therefore substantially optimal and are used to generate two phase/timing aligned signals in the phase/timing alignment modules 316 and 318. The phase/timing aligned signals are combined at the summation junction 320 to generate a phase/timing aligned output which is transferred to the equalizer 322.

Equalizer 322 is trained by the training module 324 to generate an equalized output which is transferred to the CCK decoding module 326 for demodulation. During training the output of the equalizer 322 is subtracted from a reference signal generated at the reference signal module 328 to generate an error. The error is used by the training module 324 to update the filter coefficients used in the equalizer 322 as well as the phase/timing alignment parameters. The updated filter coefficients and phase/timing alignment parameters are used again to generate new error. Thus, an iterative process is set in motion that minimizes the error and results in the equalized output.

The filter coefficients and phase/timing alignment parameters for the $k^{th}$ symbol may be written as $g_k$ whose transpose is given according to $$g_k^T = [f^* \beta^* P_1^* P_2^*]_k,$$

where $f_k$ and $\beta_k$ are defined as in equation (3), and $P_1$ and $P_2$ refer to the phase/timing alignment parameters used in the phase/timing alignment modules 316 and 318, respectively. Specifically, $P_1$ and $P_2$ represent filter coefficients that are adapted during the training process. In one embodiment of the present invention $P_1$ and $P_2$ represent an N-tap delay line with two real scaling parameters and a single rotation that are used to provide initial phase and time alignment of the two channels, as described in the prior art FIG. 1. In other embodiments of the present invention different number of filter coefficients may be used.

Allowing the phase/timing alignment parameters to adapt improves the performance of the MIMO receiver 300 compared to the prior art receiver 30 in FIG. 1. The performance of the MIMO receiver 300 may be near optimal since combining of the phase/timing aligned signals is performed prior to equalization. Nevertheless, the complexity of using a plurality of equalizers is avoided while the efficiency of the MIMO receiver 300 is enhanced.

The MIMO receiver 300, shown in FIG. 5, includes a processor (not shown), or computer medium, some type of storage area and a computer readable medium, for storing the software/firmware described in FIG. 5. The processor executes codes from the computer readable medium for effectuating the functions outlined in FIG. 5. Although the present invention has been described in terms of specific embodiment, it is anticipated that alterations and modifications thereof will no doubt become apparent to those more skilled in the art. It is therefore intended that the following claims be interpreted as covering all such alterations and modification as fall within the true spirit and scope of the invention.

What is claimed is:

1. A multi input multi output (MIMO) receiver for receiving signals comprising:
a plurality of equalizers responsive to aligned signals and operative to use the aligned signals and filter coefficients to generate a plurality of equalized outputs, said MIMO receiver for training said plurality of equalizers to adapt said filter coefficients for generating said plurality of equalized outputs, said MIMO receiver for combining said plurality of equalized outputs in time domain to generate a weighted output, said MIMO receiver for improving the quality of said weighted output by performing equalization prior to combining said plurality of equalized outputs; and
an equalizer adaptation module having a plurality of training modules for training said plurality of equalizers by updating said filter coefficients, said equalization adaptation module including said plurality of equalizers, said equalizer adaptation module for generating a plurality of errors used by said plurality of training modules to update said filter coefficients, said equalizer adaptation module for minimizing said plurality of errors to generate said plurality of equalized outputs.

2. A multi input multi output (MIMO) receiver as recited in claim 1 being responsive to a plurality of received signals being modulated in time domain to generate received baseband signals, said received signals being modulated using complementary code keying (CCK) modulation scheme, said MIMO receiver further including a synchronization (SYNC) module for computing phase/timing alignment parameters for said received baseband signals.

3. A multi input multi output (MIMO) receiver as recited in claim 2 further including a phase/timing alignment module being responsive to said phase/timing alignment parameters for applying the same to said received baseband signals to generate said aligned signals.

4. A multi input multi output (MIMO) receiver as recited in claim 1 further including a time domain maximum ratio combining (MRC) module being responsive to said plurality of equalized outputs for processing the same to generate a weighted output, said time domain MRC module being responsive to said plurality of errors for computing the square of the magnitude thereof, said time domain MRC module for averaging square of the magnitude of said plurality of errors to generate a plurality of average errors.

5. A multi input multi output (MIMO) receiver as recited in claim 4 wherein said maximum ratio combining (MRC) module including weighting computation modules for generating a plurality of weighting coefficients based on said plurality of errors, said time domain MRC module for multiplying said plurality of weighting coefficients with said plurality of equalized outputs to generate weighted equalized outputs, said weighting coefficients being used to emphasize the equalized output with substantial measure of fidelity to a reference signal.

6. A multi input multi output (MIMO) receiver as recited in claim 5 wherein said time domain maximum ratio combining (MRC) module for combining said weighted equalized outputs to generate said weighted output, said MIMO receiver for including a complementary code keying (CCK) decoding module being responsive to said weighted output for demodulating the same.

7. A method for receiving signals comprising:
processing aligned signals and filter coefficients to generate a plurality of equalized outputs;
training a plurality of equalizers, by updating said filter coefficients, to adapt said filter coefficients for generating said plurality of equalized outputs;
generating a plurality of errors used to update the filter coefficients;
minimizing the plurality of errors to generate said plurality of equalized outputs;
generating the plurality of equalized outputs using the minimized errors;
combining the plurality of equalized outputs in time domain to generate a weighted output; and
performing equalization prior to combining to improve the quality of the weighted output.

8. A multi input multi output (MIMO) receiver for receiving signals comprising:
means for processing aligned signals and filter coefficients to generate a plurality of equalized outputs;
means for training a plurality of equalizers, by updating said filter coefficients, to adapt said filter coefficients;
means for generating a plurality of errors to generate said plurality of equalized outputs and used to update the filter coefficients and for minimizing the plurality of errors and for generating the plurality of equalized outputs;
means for combining the plurality of equalized outputs in time domain to generate a weighted output; and
means for performing equalization prior to combining to improve the quality of the weighted output.

9. A non-transitory computer readable medium having stored therein computer readable program code comprising:
processing aligned signals and filter coefficients to generate a plurality of equalized outputs;
training a plurality of equalizers, by updating said filter coefficients, to adapt said filter coefficients for generating said plurality of equalized outputs;
generating a plurality of errors used to update the filter coefficients;
minimizing the plurality of errors to generate said plurality of equalized outputs;
generating a plurality of equalized outputs;
combining the plurality of equalized outputs in time domain to generate a weighted output; and
performing equalization prior to combination to improve the quality of the weighted output.

10. A multi input multi output (MIMO) receiver for receiving signals comprising:
a plurality of phase/timing alignment modules being responsive to phase/timing alignment parameters for using the same to generate phase/timing aligned signals, said MIMO receiver for training said phase/timing alignment parameters to generate said phase/timing aligned signals, said MIMO receiver for combining said phase/timing aligned signals to generate a phase/timing aligned output, said MIMO receiver including an equalizer for equalizing said phase/timing aligned output to generate an equalized output, said MIMO receiver for improving the quality of said equalized output by combining said phase/timing aligned signals;
a training module for updating said phase/timing alignment parameters, said training module for minimizing an error generated by subtracting the output of said equalizer from a reference signal to update said filter coefficients and phase/timing alignment parameters.

11. A multi input multi output (MIMO) receiver as recited in claim 10 further including an equalizer being responsive to said phase/timing aligned signals for combining the same to generate said phase/timing aligned output, said equalizer for equalizing said phase/timing aligned output to generate said equalized output using filter coefficients, said MIMO receiver further including a complementary code keying (CCK) decoding module being responsive to said equalized output for demodulation.

12. A multi input multi output (MIMO) receiver as recited in claim 11 wherein said phase/timing alignment coefficients being the coefficients of a finite impulse response (FIR) filter.

13. A multi input multi output (MIMO) receiver as recited in claim 12 being responsive to a plurality of received signals being modulated in time domain to generate received baseband signals, said received signals being modulated using complementary code keying (CCK) modulation scheme, said MIMO receiver further including a synchronization (SYNC) module for computing phase/timing alignment parameters for said received baseband signals.

14. A method for receiving signals comprising:
generating phase/timing aligned signals using phase/timing alignment parameters;
training the phase/timing alignment parameters;
updating said phase/timing alignment parameters prior to equalization;
combining the phase/timing aligned signals to generate a phase/timing aligned output; equalizing the phase/timing aligned output to generate an equalized output; and
minimizing an error generated by subtracting the equalized output from a reference signal to update said phase/timing alignment parameters.

15. A multi input multi output (MIMO) receiver for receiving signals comprising:
means for generating phase/timing aligned signals using phase/timing alignment parameters;
means for training the phase/timing alignment parameters;
means for combining the phase/timing aligned signals to generate a phase/timing aligned output; and
means for equalizing the phase/timing aligned output to generate an equalized output; and
means for updating said phase/timing alignment parameters prior to equalization and minimizing an error generated by subtracting the output of an equalizer from a reference signal to update said phase/timing alignment parameters.

16. A non-transitory computer readable medium having stored therein computer readable program code comprising:
generating phase/timing aligned signals using phase/timing alignment parameters;
training the phase/timing alignment parameters;
updating said phase/timing alignment parameters prior to equalization;
combining the phase/timing aligned signals to generate a phase/timing aligned output;
equalizing the phase/timing aligned output to generate an equalized output and
minimizing an error generated by subtracting the output from a reference signal to update said phase/timing alignment parameters.

* * * * *